April 23, 1946.  V. L. HUDSON  2,399,033
HEATER CONTROL VALVE AND SWITCH
Filed Oct. 2, 1943
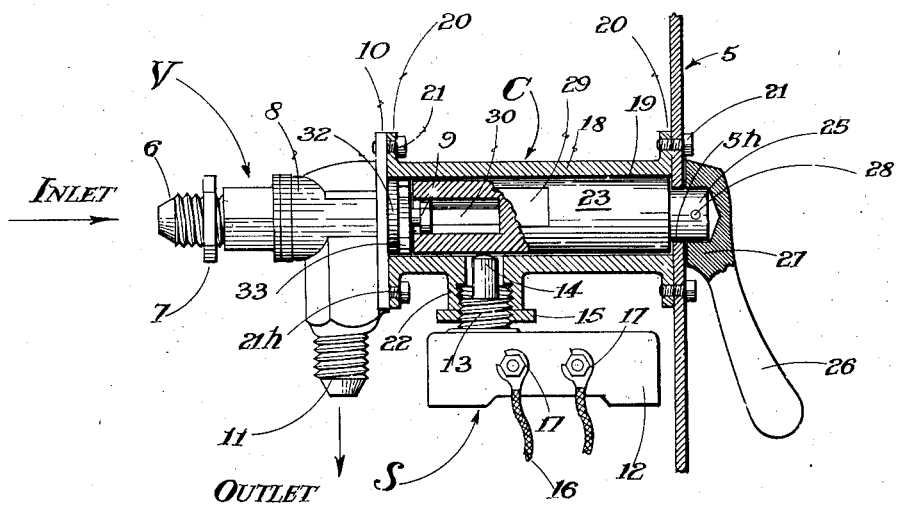
Fig. 1
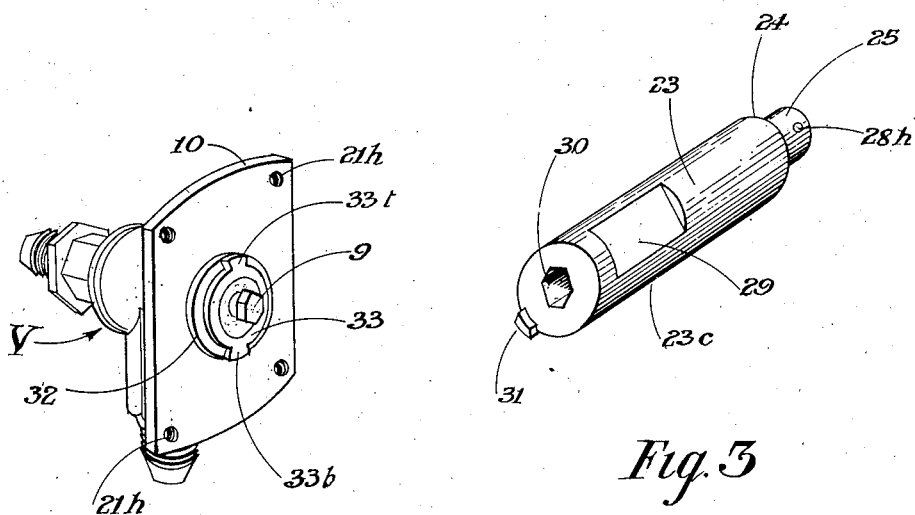
Fig. 2
Fig. 3
Verne L. Hudson INVENTOR.
BY James M. Clark
His Patent Attorney Patented Apr. 23, 1946

2,399,033

UNITED STATES PATENT OFFICE 2,399,033

HEATER CONTROL VALVE AND SWITCH

Verne L. Hudson, Wichita, Kans., assignor to Boeing Airplane Company, a corporation of Delaware Application October 2, 1943, Serial No. 504,715

4 Claims. (Cl. 200—53)

The present invention relates to control means for heaters and the like and more particularly to improvements in coincidental controls for fluid valves and electric switches for aircraft and other vehicle heaters.

In certain types of heating units, and more particularly those which are used for the heating of the closed spaces of aircraft and other vehicles, the heat is derived from the combustion of a mixture of gasoline, or other fuel, and air, which combustible mixture is ignited electrically. The products of such combustion are usually passed through a suitable radiator having sufficient surface exposed to the air within the space to be heated and which is frequently accelerated by means of a fan or blower. Inasmuch as it is essential that the fuel-air mixture is ignited substantially coincidentally or simultaneously with its initial flow, it has previously been proposed that a coincidental valve-switch unit be provided with a single manual control for the simultaneous operation of both the switch and the valve. The present invention relates to an improved coincidental valve-switch control for these and similar installations.

It is a primary object of the present invention to provide an improved unitary valve and switch control wherein both instrumentalities are coincidentally and simultaneously operated by a single control element. It is a further object to provide a control unit which is adapted to be used in conjunction with valves and switches of existing designs and to serve additionally to support these instrumentalities upon an instrument panel or other suitable wall or support.

It is a still further object to provide a relatively simple, foolproof and economical control device of this nature which will stand up under the rigorous conditions met with in vehicle service and operation. It is a further object to provide a unitary control which is readily assembled, or disassembled, from its valve and switch instrumentalities, or from the supporting panel, for servicing or repair; and which provides novel and advantageous relationships between the various components comprising the control assembly.

Other objects and advantages of the present invention will become apparent to those skilled in the art after a reading of the following detailed specification and the accompanying drawing forming a part hereof, in which:

Fig. 1 is a partial cross-sectional view of a preferred form of my unitary valve and switch control;

Fig. 2 is a perspective view of the mounting flange of the valve showing its operating connection; and Fig. 3 is a perspective view of the rotary cam element of the control unit.

Referring now to Fig. 1, there is shown the complete unitary control assembly comprising the valve V, the switch S and the intermediate control and supporting unit C by means of which the assembly is interconnected and operatively mounted upon the wall, panel, or other suitable support 5. The valve V may be of any standard type generally used for such purposes in aircraft and other vehicles, having a threaded inlet connection 6 to which the fuel supply tubing or conduit is adapted to be attached and retained as by the lock nut 7. This valve may preferably be formed with a partially cylindrical main body portion 8 within which is mounted the rotatable plug valve element having a hexagonal projection or stem 9 extending beyond the flange 10. The valve is also provided with a threaded outlet connection 11 similarly adapted for attachment to the conduit to the heater combustion chamber or other device to be supplied by the fluid. In the valve V, which has been selected for explanatory purposes only, the inlet and outlet connections are shown at right angles to each other being attached to the valve body portion 8 by means of squared or hexagonal portions by which they are adapted to be held by a wrench or other gripping device to facilitate their disassembly, or their connection to the fluid conduits. It will be apparent that valves of other types of construction than that which has been shown and described herein will also be adapted for use with the present invention.

The switch S is preferably of a well known type generally referred to as a micro-switch provided with a quick make-and-break spring or other resilient means for rapidly interrupting and closing an electrical circuit to prevent undue arcing. This switch mechanism is enclosed within the housing 12, through the upper surface of which extends the externally threaded tubular mounting connection 13 which also serves as a guide for the plunger 14. The latter is continually urged outwardly by the aforesaid spring of the switch mechanism into the "off" position of the switch, depression of the plunger 14 into its guide 13 causing closing of the switch mechanism. Suitable electrical leads or wires 16, by means of which the ignition element of the heater is connected with a suitable source of energy, are connected to the switch mechanism by the threaded terminals 17 which extend through the side of the switch housing. It will be obvious to those skilled in the art that other plunger or button actuated electrical switches of types which may be suitable to a particular use or installation may be substituted for that shown and described herein, and that where it is desirable the electrical leads may be brought through a suitable conduit or within an armored cable and terminal fitting such that their live parts or contacts will not be exposed.

The control assembly C is housed within the tubular fitting or body 18 having a main axial bore 19 and suitable end flanges 20 drilled and tapped as at 21h to receive the mounting screws 21. The body 18 is also provided with a downwardly extending boss portion having a bore at right angles to the main bore 19 and is internally threaded as at 22 to provide for mounting and supporting the threaded connection 13 of the switch S to which it is retained by means of the threaded lock nut 15. The body of the control housing and support portion 18 accordingly takes on a T-form having flanged ends and an internally threaded outlet 22 of somewhat smaller diameter than the main bore 19.

As shown in detail in Fig. 3 the cam member 23 is formed with a diameter to be freely rotatable within the bore 19 of the control body and the length of the cam shaft 23 is such that its inner end approaches the flange of the valve V in co-axial alinement with the rotatable valve elements and the stem 9. This inner end of the cam member is provided with an internally cut hexagonal opening 30 adapted to closely engage the hexagonal head or operating stem 9 of the valve. The opposite end of the member 23 is shouldered at 24 to provide a reduced diameter portion 25 which is freely rotatable within the opening 5h in the supporting panel 5 against which the shoulder 24 is adapted to bear to retain the member 23 in engagement with the valve operating head 9. A control handle 26 having a suitably bored hub as at 27 is provided for attachment to the end 25 of the cam member by means of the pin 28 passing through the hole 26h in the end portion 25. A portion of the cylindrical surface of the cam member 23 adjacent the plunger 14 of the switch S serves as a camming surface 23c and is interrupted by a milled off or cut away flat portion 29 which when rotated into contact with the plunger 14 permits the same to move upwardly under the influence of the spring in the switch mechanism, to thereby open the switch.

Referring now to Fig. 2 there is more clearly shown the hexagonal head 9 of the valve operating shaft or stem which extends through the flange 10 of the valve V. In fixed relationship to the valve and its flange 10 and extending beyond the surface of the flange there is provided a disc or plate 32 upon which there is also fixedly mounted the grooved plate 33 provided with top and bottom stops or projections 33t and 33b, respectively. The cam member 23 is formed with an integral dog portion 31 as shown in Fig. 3 which extends beyond the inner end of the cam member such that it engages the stops 33t and 33b, thereby limiting the rotation of the cam member to somewhat more than 90 and less than 180 degrees, or equivalent to the rotative angle required to move the valve operating shaft 9 and the plug mechanism from a fully closed to a fully opened position of the valve.

The control unit is preferably assembled by first inserting the cam member 23 within the bore 19 of the control body or housing 18 following which the switch S is threaded into the tapped boss 22 and retained therein by the lock-nut 15. The elements which have thus been assembled are then positioned against the panel support 5 such that the reduced diameter end of the cam member extends through the opening 5h after which the handle 26 may be attached by the pin 28 and the flange 20 attached to the panel by the attachment screws 21. It will be noted that in this stage of the assembly the cam member 23 is retained in its position within the housing 18 against the shouldered portion 24 in contact or contiguous to the face of the panel 5 by the retention effect of the handle 26 having its hub face bearing against or contiguous with the opposite face or front of the panel 5. The operating and stop portions of the valve projecting beyond its flange 10 are then inserted within the open end of the housing 18 with the hexagonal head 9 fitting into and snugly engaging the opening 30 in the cam member 23. The valve V is then securely attached to the assembly by means of the screws 21 passing through the flanges 10 and 20. The fluid conduit or tubing connections can then be made to the inlet and outlet 6 and 11, respectively, and the leads 16 may be attached to the switch S at the terminals 17 to complete the installation.

The operation of the valve and switch control unit when used in an electric ignition gasoline heater system is as follows: Let us assume that the gasoline fuel supply is flowing to the inlet side of the valve and the leads of the micro-switch have been properly connected to the ignition for the heater combustion chamber as well as to the source of electrical energy. In the position shown in the cross-section of the valve-switch unit in Fig. 1, the dog 31 is on the far side of the cam member 23 and has been rotated downwardly in a clockwise direction into the position in which it engages and is stopped by the projection 33b at the bottom of the plate 33 fixed to the valve and its flange 10. In this position in which the control unit is indicated in Fig. 1 the full diameter of the camming surface 23c has been rotated into the lower position where the plunger 14 of the micro-switch has been depressed and the switch is in the "closed" position for the ignition of the fuel within the heater chamber and the valve operating stem 9 has also been rotated into the position in which the valve is "open" and the fuel supply flows therethrough to the heater combustion chamber.

In order to close the fuel valve and open the switch the handle 26 is rotated upwardly and away from the reader as viewed in Fig. 1, or in a counterclockwise direction as viewed looking toward the handle from the front of the panel 5. As this rotation continues through the requisite angle, the edge of the flat side of the cam surface 29 comes into contact with the rounded end of the switch plunger 14, permitting the same to extend upwardly under the influence of the switch spring to a position in which the quick action of the spring snaps the switch beyond the dead-center position and the contact is broken, as the valve is simultaneously fully closed.

As indicated above, the coincidental valve-switch control comprising the present invention is adapted to support and operate other valves than that shown in the drawing so long as they are of a rotatable plug, cock or similar type with quick-opening features. In valves in which the rotation limiting means are integral or built-in, the dog 31 and engaging stops may obviously be dispensed with. The present switch control is also adapted to support and actuate microswitches and similar contact switch devices, other than that which has been selected for explanatory purposes. Similarly, the attachments of the control body to the valve and switch devices may be either of the screwed, bolted, riveted or other type. Other forms and modifications of the present invention both with respect to its general arrangement or specific details which may become obvious to those skilled in the art after a reading of this specification are intended to come within the scope and spirit of the present invention as more fully set forth in the appended claims.

I claim:

1. Means for actuating and supporting a unitary valve and switch construction upon a panel support comprising a housing member provided with oppositely disposed end attachment means for connecting said member to said valve and to the far side of said panel support respectively, said valve having an actuating stem, said housing member having a cylindrical bore co-axially disposed with respect to said actuating stem of said valve, said switch having a reciprocable actuating part, a rotatable actuating element journalled within said cylindrical bore having a clutching recess at its inner end for engagement with said valve actuating portion, a cam face portion for engagement with said switch actuating part and a reduced diameter stub portion extending through said supporting panel at its opposite near end, stop means cooperatively carried by said valve and said rotatable element adapted to limit the rotation of said valve actuating stem, and manual means having a hub portion engageable from the near side of said panel with the said stub portion of said actuating element adapted for the rotation of said valve and switch actuating element.

2. Means for actuating and supporting a unitary valve and switch construction upon a panel support comprising a cylindrical housing member provided with oppositely disposed end attachment means for connecting said member to said valve and to the far side of said panel support respectively, said valve being of the rotary type having an extended actuating stem, said switch being of the rectilinearly reciprocable type having an extended actuating plunger, said housing member of substantially T-form having an aperture axially disposed at its inner end to receive said valve actuating stem and an aperture radially disposed intermediate its end portions adapted to receive said switch actuating element, said housing member having means adjacent said apertures adapted for the attachment of said valve and switch thereto, said housing member having an attachment flange disposed at its near end for connection to the far side of said supporting panel, a rotatable element having an end socket and side cam face adapted for engagement with said valve and switch actuating elements respectively, said rotatable element journalled within said housing member and having a stub portion at its near end extending through an opening in said supporting panel, and manual means having a hub portion engageable from the near side of said panel with the said stub portion of said rotatable element adapted to limit the axial movement of said element with respect to said supporting panel and said housing member, said manual means adapted for the rotation of said valve actuating element.

3. Means for actuating and supporting a unitary valve and switch assembly upon a supporting panel comprising a housing member provided with oppositely disposed end attachment means and laterally disposed attachment means for connecting said member to said valve, to said supporting panel and to said switch respectively, said housing member being of substantially T-form having an aperture axially disposed at its inner end to receive an actuating portion of said valve, said housing member having a laterally disposed aperture intermediate its end portions adapted to receive an actuating portion of said switch, said housing member having means adjacent said apertures adapted for the attachment of said valve and switch thereto and having means disposed at its near end for attachment to said supporting panel, a rotatable element having means disposed at one end for engagement with said valve actuating portion and means intermediate its end portions for engagement with said switch actuating portion, said rotatable element journalled within said housing member and having a reduced diameter portion at its near end adapted to extend through an opening in said supporting panel and manual means having a hub portion engageable from the near side of said panel with the said reduced diameter portion of said rotatable element adapted for the manual actuation of said valve and switch elements.

4. In an aircraft heater control mechanism, means for coincidentally actuating unitary valve and switch instrumentalities comprising a panel having an aperture within which said valve and switch assembly is adapted to be supported, a housing member provided with end attachment means and laterally disposed attachment means for the connection of said member to said valve and switch instrumentalities, said housing member having an opposed end attachment means for the fastening of said housing member to said panel, said housing member being of substantially T-form having apertures in the region of its said attachment portions to receive actuating portions of said instrumentalities, a rotatable element having means disposed at one end and intermediate its end portions for engagement with the actuating portions of said instrumentalities, said rotatable element journalled within said housing member and having a reduced diameter portion at its near end adapted to extend through said aperture in said supporting panel, and manual means having a hub portion engageable from the near side of said panel with the said reduced diameter portion of said rotatable element adapted for the coincidental manual actuation of said valve and switch instrumentalities.

VERNE L. HUDSON.